Sept. 26, 1933.    J. BLEDOWSKI    1,928,088
OPTICAL RECTIFIER
Filed Sept. 9, 1927
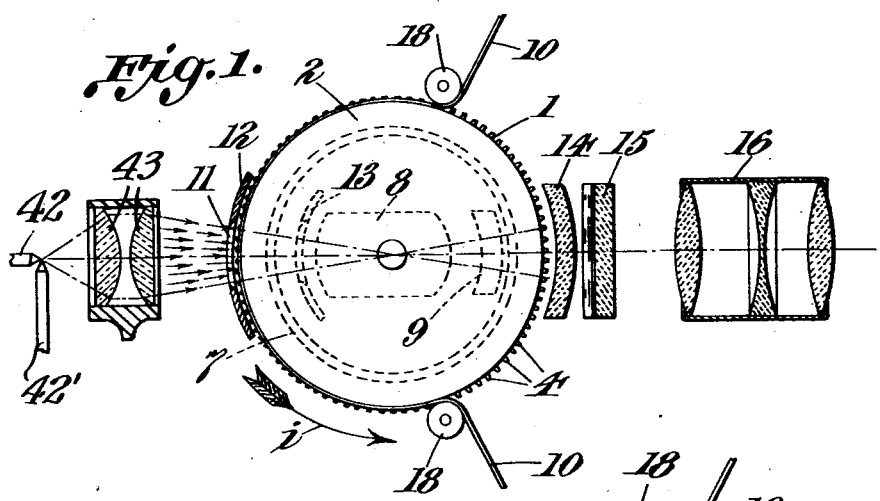
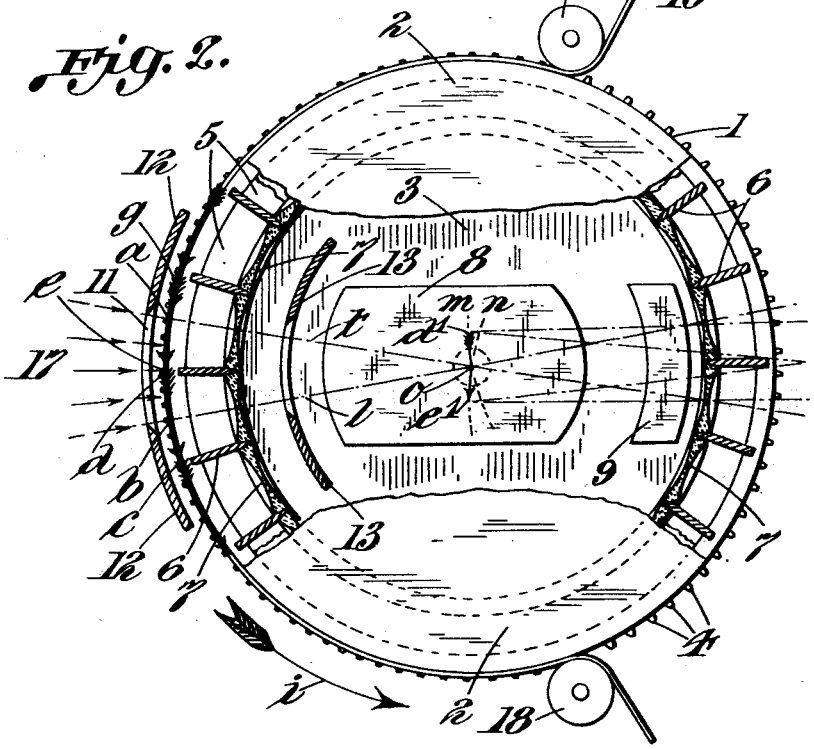
Inventor,
Jan Bledowski Patented Sept. 26, 1933

1,928,088

UNITED STATES PATENT OFFICE 1,928,088

OPTICAL RECTIFIER

Jan Bledowski, Warsaw, Poland

Application September 9, 1927, Serial No. 218,447, and in Poland October 23, 1926

24 Claims. (Cl. 88—16.8)

The present invention relates to optical rectifiers.

The construction of a cinematographic apparatus which is the aim of this invention, is based on a special new process of optical fixation of an image of a moving object. The process and the apparatus are as well applicable for the taking of views as for projection. The process in question is of an entirely general character and can serve as a foundation for different accomplishments.

A cinematographic apparatus built according to the present invention solves the following problems: the continuous movement of the film and the continuous duration of the image on the screen, this result being obtained with the aid of a very small number of optical component parts, and solely by the rotary movement of the stabilizing mechanism. In contradistinction to apparatus previously known, constructed for the same purpose, the apparatus hereinafter referred to avoids the employment of an excessive number of optical component parts, and does not necessitate the mechanical accuracy and precision of the different parts, complications which are a source of failure of such apparatus.

The process of fixation of an image of a moving object (for example, a point of the hereinafter mentioned film 10) is based on the optical connection of a certain point of the moving object—or (as in the case of the film) its moving surface—with a fixed point of the optical arrangement, such as the hereinafter-described point O. This arrangement co-ordinates the moving optical system (for example, the lenses 7, 7, hereinafter described) with the fixed optical system (as the lenses 8 and 9), and it is to be observed that in the case of such a movement taking place in a plane surface (as in the case of the film 10), the said connected points become converted into straight lines; for example, a line transversely disposed across the film 10 and the axis O of the cylindrical drum, as hereinafter described.

A fixed point or a fixed straight line of the optical arrangement consists of a point or a straight line which is determined by the geometrical co-ordination or coincidence of the optical centre (for example, O) of the fixed optical system (such as the lenses 8, 9) with the point or the axis of rotation of the moving optical system (such as the lenses 7, 7). The above process of obtaining optical fixation of the image of the moving objects enables the nature of the optical component parts which form the said optical systems to be easily defined. The fixed optical systems must be composed of non-axial optical elements (such as the hereinafter described lenses 8, 9), possessing a common optical centre, or of axial optical elements whose optical centres represent essentially a point or a line or a portion of a straight line. The movable optical systems (such as the hereinafter described lenses 7, 7) can be formed of any kind of optical elements with the exception, however, of those whose optical centres are on the axis of rotation (O) of the movable system. The process of co-ordination of the said two kinds of optical systems (such as the system 8, 9 and the system 7, 7), and the process of determination of the fixed point or of the fixed line (such as the stabilizing point or line O) of the optical arrangement constituted by the said two optical systems combined is based upon the definition of the process given above. This fixed point or line may conveniently be referred to as the stability factor.

The above mentioned process of optical co-ordination results, as will be hereinafter explained, in a fixed virtual image of the moving object or its component parts, fixed, for example, at O. This virtual image is the basis for the formation of a real image at any desired distance from the stabilizing mechanism. This can be achieved by applying to the stabilized image an optical objective (as the objective 16 hereinafter mentioned) or an equivalent optical instrument. The said real image is determined, according to the above-described process, by the said virtual image alone.

In the accompanying drawing, Fig. 1 is a diagrammatic view, partly in side elevation and partly in section, of cinematographic apparatus constructed according to a preferred embodiment of the present invention; and Fig. 2 is a similar view, upon a larger scale, and with parts broken away, of a portion of the apparatus shown in Fig. 1.

The stabilizer 1 is composed of two spaced discs 2 and 3 carrying the teeth 4. The discs 2 and 3 are joined together as a mechanical unit by means of the rings 5 and the radial partitions 6, and constitute thus a skeleton drum which rotates upon the axis O in the direction of the arrow $i$. The stabilizer comprises also the lenses 7 mounted on the drum and the optical solids 8 and 9 that are stationary. The lenses 7 are mounted in grooves cut in the inner walls of the rings 5 and constitute a rotary optical arrangement having the following properties:

(I) The focal lengths of the lenses 7 are equal and negative.

(II) The number of the lenses of the arrangement is even.

(III) The principal optical axes of each pair of opposite lenses are coincident.

(IV) The optical axes of each pair of diametrically opposed lenses are in a plane surface, perpendicular to the axis of rotation of the stabilizer 1, and intersect at the point O, situated on the axis of rotation of the stabilizer.

(V) The angles formed by adjacent optical axes are equal to one another.

The fixed or immovable lenses 8 and 9 have respectively a positive and a negative focal length. Their surfaces being spherical and concentric, with their optical or geometric centers substantially coincident with the center O of the drum, they constitute non-axial optical solids. These centrally disposed solids have a common optical or geometric centre on the axis O of rotation of the movable part of the stabilizer 1,—that is, the part carrying the lenses 7. The point of intersection of the principal optical axes of the lenses 7 coincides with the axis O. The film 10 is disposed along the periphery of the drum and engages with the teeth 4 so as to move with the stabilizer in the direction of the arrow i, and the lenses 7 are rectangular to conform to the configuration of the film-area pictures. The partitions 6 are radially disposed at intervals corresponding to those separating the successive images of the film. The film 10 is so disposed on the teeth 4 of the discs 2 and 3 that the successive images correspond with the diametrically opposed partitions 6 and with corresponding pairs of opposed lenses 7. The film is held against the drum by rollers 18.

As the drum rotates, consecutive pairs of opposite lenses 7, and the centrally disposed lenses 8 and 9, connect the point O optically with the points of the film 10, so that the images of the film 10 are produced about the point O, as hereinafter described.

A gap 11 cut in the frame 12 limits the pencil of luminous rays 17 which is projected from a projection lamp on to the film 10. This limitation restricts the illuminated field of the film, which is equal to the field of one single image on the film, including the dividing line between successive images.

The stabilizer is thus composed of a series of optically constant, individual units or systems, each comprising a left-hand lens 7, the centrally disposed lenses 8 and 9, and the oppositely disposed, right-hand lens 7. To each individual, optical unit there corresponds, for the time being, a single film-picture area, the picture area being changed every time that the optical unit makes a half revolution with the drum. In the case of a two-dimensional figure, such as the film 10, disposed along the periphery of the drum, O represents the axis of the cylinder. If the movement of the object takes place in three-dimensional space, O is then a point. For definiteness, and to avoid circumlocution of language, the point O and the axis O are referred to in the specification by the generic term "point".

The fixed, non-axial, optical elements 8, 9, having their optical or geometric centers at the stable point or axis O, and the rotary optical elements 7, 7, the optical centers of which are not disposed at O, constitute together a mechanical-optical system in which any point or transverse line of the film is optically connected with the stable point or axis O. The image of the film section is thus fixed at O.

Each individual picture of the film 10 is coordinated with a corresponding individual optical system 7, 8, 9, 7, and is composed partly of light-converging and in part of light-diverging elements. The converging lens group comprises lenses 7, 8, and the diverging lens group comprises lenses 9, 7. The group 7, 8 exerts a strong convergent effect upon pencils of rays, sent out by luminous points of the film, because the lens 8 is strongly convergent, whilst the divergent effect of the negative lens 7 is negligible, due to its proximity to the film 10. The convergent effect of the group 7, 8 upon the light cone 17 from the usual arcs 42, 42' and condenser 43 is, however, small. In this case, a strong divergent effect is exerted by the negative element 7, due to its location at a distance from the point of convergence of the cone 17, and thus the effect of the positive lens 8 is neutralized.

As a result of this construction of the stabilizer, the light which passes through the film is made to penetrate without loss, and in suitable form, to the last lens 7 of the individual system. This lens, of necessity small, and located far from the illuminated portion of the film, forms the final virtual image in the stabilizer.

Because of these circumstances, the cone 17 can be made to converge at a place which makes it conveniently possible to obtain a good optical image on the screen.

The effect obtained is as though each pair of lenses 7, 7 were provided with two separate positive and negative lenses 8, 9, the whole rotating as an optical unit separate and distinct from the other and similar optical units, the separate units being disposed in series at equal angular intervals about O. In the actual arrangement illustrated, of course, the lenses 7, 7 are alone turned about O with the film, the lenses 8 and 9 remaining stationary, though operating, as before described, like separately associated lenses rotating with each pair of lenses 7, 7.

This arrangement of lens-unit systems results in the throwing of a very strong illumination upon the screen, particularly if, as illustrated, the pencil of rays 17 for illuminating the film 10 is converging. These converging rays will meet somewhere in the lens 8 to form a bright source of light. This optical arrangement also contributes to the accuracy of the resulting image. If, however, the virtual image $d'$, $e'$ has certain optical defects, they may readily be corrected for by proper design.

The focal length of the individual, unit optical systems, the location of the refracting surfaces of the individual lenses, the enlargement of the image and other factors may all be computed according to well known principles.

At the particular stage of the movement of the stabilizer 1 represented on the drawing, the following results are obtained.

The film 10 is moved in unison with the rotating drum about its axis O. Each picture area of the film is associated with one of the individual lens-unit systems 7, 8, 9, 7. The aperture 11, through which the light rays 17 are projected upon the film in the form of a pencil of rays, is of about the same magnitude as the individual film-picture areas. The light passing through the aperture 11, therefore, can not impinge upon more than two film-picture areas at a time, and the total area thus illuminated is equal to the area of a single film picture. The light thus passing to the film is transmitted through corresponding, optical-unit systems 7, 8, 9, 7.

In the case where an individual film-picture area is exactly alined with the aperture 11, a virtual image of the same will be produced at O. In the more general case, however, parts $a$, $b$ and $d$, $b$ of two adjacent film picture areas $g$, $e$ and $d$, $c$ will be alined with the aperture 11. In that event, two virtual images $o$, $e'$ and $o$, $d'$ of the said two portions $a$, $e$ and $d$, $b$ of the film picture areas will be formed at O, as will now be explained. This more general case is illustrated in the drawing.

The points $a$ and $b$ of the images $c$—$d$ and $e$—$g$ of the film 10, being the points of intersection with the film of the optical axes $l$ and $t$, of the respective lenses 7, are connected with the point O by the optical system of the stabilizer 1. The simultaneous projection of the points $a$ and $b$ at the point O would result in a superposition at the point O of the images of these points, as well as of the images of lines transverse to the film (or perpendicular to the plane of the drawing) at the points $a$ and $b$.

In order to avoid this superposition (which, in this case, could involve the whole of the surface of two successive images $g$ $e$ and $d$ $c$ of the film 10), the gap 11 may be made larger or smaller, thus to regulate both the size of the illuminated surface of the film 10 and the size of the image $d'$ $e'$.

The optical systems of the stabilizer 1 produce straight, virtual images; therefore, $d'$ O is the image of the illuminated part $b$ $d$ of the image $c$ $d$ and O $e'$ is the image of the illuminated part $e$ $a$ of the image $e$ $g$ of the film 10. The image $d'$ $e'$ is formed, therefore, by parts of two adjacent images on the film. Those parts become successively replaced in the illuminated field by others, because, as one part of the image $c$ $d$ is getting out of the illuminated field and is entering into the darkness behind the frame 12 of the gap 11, another part of the image $e$ $g$, which is similar and equal to the former is coming into the illuminated field. The sum of the fields which constitute the image $e'$ $d'$ is consequently not variable. Because the successive film pictures are so nearly alike, the resulting virtual image $d'$ $e'$ is practically the same as an image of a single film picture.

In the same way, an image becomes formed around the point O by each of the adjacent pairs of the images of the film 10. In consequence of this, a constant cinematographic, virtual image $e'$ $d'$ exists around the point O. It is this virtual image that is then projected by the optical objective 16 upon the screen. The image $d'$ $e'$ will obviously rock or oscillate between the lines $m$, $n$ about O, the upper part O $d'$ and the lower part O $e'$ oscillating as individual units about O, each following the rotation of its corresponding lens-unit system about O. The virtual image $d'$ $e'$ is always formed about O, and does not move first, above O, and then, below O, as is common with present-day constructions. As the image is thus localized about O, one source of flicker is thus eliminated, as the real image corresponding to the virtual image $d'$ $e'$ will be projected upon the screen (not shown) without any up-and-down variation. Other sources of flicker are also compensated for, as will be explained. Between the virtual image $e'$ $d'$ and the optical objective 16, the rays pass through an interposed arrangement of two crossed cylindrical lenses 14 and 15, having a common axial refracting surface, or through equivalent optical elements for normalizing or flattening out the Petzval curves $m$ and $n$.

These lenses 14 and 15 have the following properties:—

1. One of them, 14, is co-axial with the stabilizer 1, and the second one, 15, is disposed at right angles to the former.
2. Both the above lenses constitute together an optical arrangement which does not alter the sphericity of the pencil of rays passing through it.

The arrangement of the lenses 14 and 15 does not effect any alteration of the size of the image, and it does not displace the image in any appreciable manner. In accordance, however, with known optical principles of relations between the focal lengths of the lenses, and the curve of the image, these lenses flatten the curves $m$ and $n$ of the image $d'$ $c'$ which is formed by the rays of the stabilizer 1 at O, and permits the use of a stabilizer operating with short rays.

Under certain conditions, depending on the radius of the stabilizer 1, the focal lengths of the lenses 7, 8, and 9 and on the indices of refraction of the glass of the lenses, straightening out of the curves $m$ and $n$ may be effected by replacing the lenses 14 and 15 by spherical, or other non-spherical lenses.

The diaphragm 13 prevents the luminous rays from spreading out to the oppositely disposed lenses 7, near the lens 9, adjacent to those through which the rays are intended to pass.

The lenses 7 are carried by the rings 5 between the partitions 6. These, besides holding the rings 5 separated, optically isolate the lenses 7, so as to prevent the light rays 17 impinging upon adjacent lenses. The partitions 26 do not interfere with the passage of the light rays, as they are all located on the other side of the film from that which is exposed to the light rays, and along the dividing line between the successive film-picture areas.

The optical design of the stabilizer is such that correction may be made for the two aberrations which appear, and for other optical defects, either independently of the objective 16, or with its help. To achieve this result, or for different purposes, other lenses or other suitable optical devices may be added to the lenses mentioned in the description.

The above description has been confined to a general mechanical and optical explanation of the system, and to the working of the apparatus itself.

Nothing has been said in this description about the projection of the images of the film from the cylindrical surface, by the medium of optical arrangements whose axes are distorted, as the solution of that problem is purely technical and is already known. In principle, the image thrown on the screen becomes flattened or normalized through its having passed the positive optical system which projects images on the screen by the pencil of rays 17. This flattening is effected by having the curves of the negative optical system of lenses 7 correspond to the distortions of the surface of the straight image $e'$ $d'$ in the stabilizer 1. This normalization results in a uniformly sharp and clear image on the screen, notwithstanding the rocking movement of the parts $m$ and $n$ of the virtual image $d'$ $e'$.

The individual, optical-unit systems 7, 8, 9, 7 convert the continuous movement of the images of the film 10 into a rocking movement of their virtual optical images $m$, $n$, the rocking movement of the virtual images being synchronized with the rotation of the drum. After correction, the virtual images are projected upon the screen in the form of a real image. The real image is without flicker, without blur, and without any rocking movement corresponding to the rocking movement of the virtual image. The efficient operation of the individual, optical-unit systems, the adaptability of the individual, the optical-unit systems to the converging pencil of rays 17, the illumination of the film with this pencil, and the rectangular shape of the lenses 7 and their optical isolation by means of the partitions 6, all aid in the formation of a clear, accurate, sharp image, intensely and uniformly illuminated.

This is because the lens system 8, 9 is invariant to the direction of light rays. Though the invention has thus been illustrated and described in connection with a specific optical-mechanical mechanism, to fix the ideas, it will be understood that this is for illustrative purposes, as required by the statutes, and that the invention is of broader scope. Thus, as the film 10 is restricted, according to the illustrated embodiment of the invention, to movement along a cylindrical (two-dimensional) surface, the stability factor, as above pointed out, is a straight line, namely, the axis O of the cylinder. It will be understood, however, that the present invention is equally applicable to three dimensional movement of the object, in which event, the stability factor would become a mere point.

In all cases, as will be understood, however, the optical center of the fixed optical system is disposed upon the axis of rotation of the movable optical system. According to the illustrated embodiment of the invention, too, the image d' e' must always be virtual, as it is not possible to have a real image at the center of an optical system. This is particularly true where, as here, the fixed optical system 8, 9 is non-axial, the refracting lens surfaces having a common center at O, which is also the center of rotation of the moving optical system 7, 7. The lens system 7, 7 may also be non-axial, but, in that event, its optical system could not be located at O. In all such cases, the optical system, as a unit, acts in the same way, irrespective of the angular location of the lenses 7, 7.

Other modifications and changes will also obviously occur to persons skilled in the art, and all such are considered to fall within the spirit and scope of the invention, as defined in the appended claims, it being understood that the claims are to be broadly construed, except insofar as it may be necessary to impose limitations in view of the state of the art.

What is claimed is:

1. An optical system having, in combination, a rotary drum having a plurality of substantially similar lenses equally spaced side by side along the circumference of the drum, and a fixed optical system having refracting surfaces in the form of concentric spheres the center of which is substantially at the center of the drum.

2. An optical system having, in combination, a rotary drum having an even number of substantially similar lenses equally spaced side by side along the circumference of the drum and separated by radial partitions, the drum having peripheral teeth for engaging a film, and a fixed optical system within the drum having refracting surfaces in the form of concentric spheres the center of which is substantially at the center of the drum.

3. An optical system as defined in claim 2 in which the fixed optical system comprises a lens having a positive focal length and a lens having a negative focal length.

4. An optical system as defined in claim 2 provided with two cylindrical lenses at right angles to each other for flattening the image, the axis of one of the cylindrical lenses passing optically through the center of the drum.

5. An optical system having, in combination, a plurality of substantially similar lenses equally spaced side by side along a circular arc, and a solid optical unit having a spherical refracting surface concentric with the circular arc and positioned at the center of the circular arc.

6. An optical system having, in combination, a plurality of substantially similar lenses equally spaced side by side along a circular arc, and a solid optical unit having spherical refracting surfaces concentric with the circular arc and positioned at the center of the circular arc.

7. An optical system as defined in claim 6 in which the optical unit is associated with a concave lens having a spherical refracting surface concentric with the center of the circular arc.

8. An optical system as defined in claim 5 in which the similar lenses are concave.

9. An optical system as defined in claim 5 in which the similar lenses are even in number.

10. An optical system having, in combination, a rotary drum having a plurality of substantially similar lenses equally spaced side by side along the circumference of the drum, means for holding a portion of a film in curved condition around a portion of the periphery of the drum, means for continuously rotating as a unit the drum and the said portion of the film, a frame disposed adjacent to the periphery of the drum having an opening corresponding in area to the area of one of the lenses, means for sending light in the form of a cone of rays through the opening to illuminate the film and through portions of the two lenses adjacent to the opening, a convex lens having as its surface a sphere the center of which is substantially at the center of rotation of the drum and a concave lens having refractory surfaces in the form of concentric spheres the center of which is substantially at the center of the drum, whereby light rays from the illuminated film are caused to travel through portions of the said two adjacent lenses and through the convex lens to produce together about substantially the center of the drum an image of the said portion of the film.

11. An optical system having, in combination, a plurality of substantially similar lenses spaced along a circumference, and a fixed positive-focal-length lens having refracting surfaces in the form of concentric spheres the center of which is substantially at the center of the circumference.

12. An optical system having, in combination, a plurality of substantially similar lenses spaced along a circumference, and a fixed optical system having refracting surfaces in the form of concentric spheres the center of which is substantially at the center of the circumference, the fixed optical system consisting of a lens having a positive focal length and a plurality of lenses having negative focal lengths.

13. An optical system having, in combination, a plurality of substantially similar lenses spaced along a circumference, a fixed optical system having refracting surfaces in the form of concentric spheres the center of which is substantially at the center of the circumference, and an auxiliary optical arrangement for forming Petzval curves of the image.

14. An optical system having, in combination, a plurality of substantially similar lenses spaced along a circumference, a fixed optical system having refracting surfaces in the form of concentric spheres the center of which is substantially at the center of the circumference, and two cylindrical lenses at right angles to each other for forming Petzval curves of the image, the axis of one of the cylindrical lenses passing through the said center.

15. An optical system having, in combination, a plurality of substantially similar lenses equally spaced side by side along a circular arc, the lenses being separated by partitions, and an optical unit having refracting surfaces in the form of spheres concentric with the circular arc.

16. An optical system comprising two rings arranged side by side in parallel, a plurality of partitions radially disposed between and connecting the rings, two discs connected with the rings to form a drum, and a lens between each two partitions.

17. In an optical rectifier, in combination, a first optical unit, a second optical unit, one of the units receiving light rays from the other unit, means for moving the second unit relatively to the first unit about a line that is at the axis of movement of the second unit, means for relatively moving an object with the second unit, the units cooperating to form an image of the object, and means for directing light rays through the units when they occupy a predetermined relative position, the units being coordinated together to constitute means for optically connecting a line of the object with the axial line of the second unit, whereby the said image will be formed substantially about the said axial line.

18. In an optical rectifier, in combination, a first optical unit, a second optical unit comprising a rotary drum having a plurality of substantially similar lenses equally spaced side by side along the circumference of the drum, one of the units receiving light rays from the other unit, means for holding a portion of a film in curved condition around a portion of the periphery of the drum, means for continuously rotating as a unit the drum and the said portion of the film, the units cooperating to form images of the said portion of the film, and means for sending light in the form of a cone of rays through successive portions of the film and through two lenses adjacent to the said successive portions during the rotation of the drum, whereby light rays from the illuminated film are caused to travel through portions of the said two adjacent lenses and through the first unit, the units being coordinated together to constitute means for optically connecting a line of the film with the axis of the drum when the line occupies a predetermined position, whereby the said images will be formed substantially about the said axis.

19. In an optical rectifier, in combination, a first optical unit, a second optical unit, one of the units receiving light rays from the other unit, means for rotating the second unit relatively to the first unit about a line that is at the optical center of the first unit, means for relatively rotating with the second unit a film having a plurality of pictures, the units cooperating to form images of the pictures, and means for illuminating the film, the units being coordinated together to constitute means for optically connecting a line of the film with the said center line, whereby the said images will be formed substantially about the said center line.

20. In an optical rectifier, in combination, an optical unit comprising a plurality of substantially similar lenses disposed side by side along the circumference of a cylinder, means for associating a plurality of correspondingly similar objects with the lenses, each object being disposed before its associated lens, an optical unit having an optical center line disposed substantially on the axis of the cylinder, one of the units receiving light rays from the other unit, means for relatively moving the lenses and their associated objects along the circumference of the cylinder, the units cooperating to form images of the objects, and means for illuminating the objects, the units being coordinated together to constitute means for optically connecting a line of the objects with the said axial line, whereby the said images will be formed substantially about the said axial line.

21. In an optical rectifier, in combination, a non-axial optical unit having a fixed optical center line, a second optical unit, one of the units receiving light rays from the other unit, means for rotating the second unit relatively to the first unit about the center line, means for relatively moving an object with the second unit, the units cooperating to form an image of the object, and means for directing light rays through the units when they occupy a predetermined relative position, the units being coordinated together to constitute means for optically connecting a line of the object with the center line, whereby the said image will be formed substantially about the center line.

22. In an optical rectifier, in combination, a first optical unit, a second optical unit comprising a plurality of substantially similar lenses disposed side by side, one of the units receiving light from the other unit, means for rotating the second unit relatively to the first unit about a line, means for associating a plurality of correspondingly similar objects with the lenses, each object being disposed before its associated lens, the units cooperating to form images of the objects, and means for illuminating the objects when they are disposed in a predetermined portion of their path of relative rotation to permit light rays from the illuminated objects to travel through the units, the units being coordinated together to constitute means for optically connecting a line of the objects with the axial line of the second unit, whereby the said images will be formed substantially about the first-named line.

23. An optical system having, in combination, a first optical unit, a second optical unit comprising a plurality of substantially similar lenses disposed side by side, one of the units receiving light from the other unit, means for rotating the second unit relatively to the first optical unit about a line, means for associating a plurality of correspondingly similar objects with the lenses, each object being disposed before its associated lens, the units cooperating to form images of the objects, and means for illuminating the objects along an area equal to the area of one only of the objects during their said rotation to permit light rays from the illuminated objects to travel through portions of two adjacent lenses and through the first unit, and the units being coordinated together to constitute means for optically connecting a line of the objects with the axial line of the second unit, whereby the images of portions of not more than two adjacent objects will be formed substantially about the first-named line over an area equal to the area of one only of the objects.

24. An optical system having, in combination, a first optical unit, a second optical unit comprising a rotary drum having a plurality of substantially similar lenses equally spaced side by side along the circumference of the drum, one of the units receiving light from the other unit, means for holding a portion of a film in curved condition around a portion of the periphery of the drum, the units cooperating to form an image of the film, means for continuously rotating as a unit the drum and the said portion of the film, and a frame disposed adjacent to the periphery of the drum having an opening corresponding in area to the area of one of the lenses, the units being coordinated together to constitute means for optically connecting the axis of the drum with a line of the film, whereby images of the said portion of the film will be formed substantially about the axis of the drum.

JAN BLEDOWSKI.